(12) United States Patent
Hansen et al.

(10) Patent No.: US 12,144,295 B1
(45) Date of Patent: Nov. 19, 2024

(54) SMART IRRIGATION SYSTEM

(71) Applicant: United Services Automobile Association (USAA), San Antonio, TX (US)

(72) Inventors: Gregory David Hansen, San Antonio, TX (US); Andre Rene Buentello, San Antonio, TX (US); Jose L. Romero, Jr., San Antonio, TX (US); Nina Cooper, San Antonio, TX (US); Galo M. Alava, Tampa, FL (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 0 days.

(21) Appl. No.: 18/206,695

(22) Filed: Jun. 7, 2023

Related U.S. Application Data

(63) Continuation of application No. 17/550,683, filed on Dec. 14, 2021, now Pat. No. 11,707,026.

(60) Provisional application No. 63/126,779, filed on Dec. 17, 2020.

(51) Int. Cl.
*A01G 25/16* (2006.01)
(52) U.S. Cl.
CPC .......... *A01G 25/167* (2013.01); *A01G 25/162* (2013.01)
(58) Field of Classification Search
CPC .......................... A01G 25/167; A01G 25/162
See application file for complete search history.

(56) References Cited

U.S. PATENT DOCUMENTS

| | | | | |
|---|---|---|---|---|
| 5,156,494 | A | * | 10/1992 | Owens .................... E02D 31/10 405/36 |
| 5,908,045 | A | * | 6/1999 | Wallace ............... A01G 25/167 137/78.3 |
| 6,132,138 | A | | 10/2000 | Haese |
| 8,322,231 | B1 | * | 12/2012 | O'Rourke ................. G01L 1/02 73/862.581 |
| 9,202,252 | B1 | * | 12/2015 | Smith ..................... G06Q 50/02 |
| 10,410,289 | B1 | * | 9/2019 | Tofte ....................... G06V 20/10 |
| 10,497,250 | B1 | * | 12/2019 | Hayward ............... G06N 3/088 |
| 2012/0060932 | A1 | | 3/2012 | Gutierrez-Wolf et al. |
| 2012/0199220 | A1 | * | 8/2012 | Knepp .................... E03B 1/041 137/558 |
| 2012/0261352 | A1 | * | 10/2012 | Kawasaki ............... C02F 1/008 210/744 |
| 2013/0071186 | A1 | | 3/2013 | Ekern |
| 2018/0089988 | A1 | * | 3/2018 | Schwarzkopf ......... G06Q 50/08 |
| 2018/0209787 | A1 | * | 7/2018 | Ryu ......................... G01V 3/28 |

(Continued)

FOREIGN PATENT DOCUMENTS

| | | | |
|---|---|---|---|
| CN | 110130446 A | 8/2019 | |
| WO | WO-2017083673 A1 | * 5/2017 | ........... A01G 25/167 |

*Primary Examiner* — Chad G Erdman
(74) *Attorney, Agent, or Firm* — Fletcher Yoder, PC

(57) ABSTRACT

The present disclosure is related to a smart irrigation system that includes a first sensor configured to monitor a moisture level at a location and a second sensor configured to monitor a contamination level within a fluid. The smart irrigation system also includes one or more processors configured to receive a first signal from the first sensor, receive a second signal from the second sensor, and route the fluid to the location in response to the first signal indicating that the moisture level is below a moisture threshold and the second signal indicating that the contamination level is below a contamination threshold.

20 Claims, 4 Drawing Sheets

(56) References Cited

U.S. PATENT DOCUMENTS

| | | |
|---|---|---|
| 2018/0325050 A1 | 11/2018 | Bye et al. |
| 2019/0263697 A1 | 8/2019 | Ganzi et al. |
| 2020/0181889 A1* | 6/2020 | Baer ................. E03D 5/003 |
| 2021/0079630 A1 | 3/2021 | Poojary et al. |
| 2022/0171414 A1 | 6/2022 | Karri et al. |

* cited by examiner

SMART IRRIGATION SYSTEM

CROSS-REFERENCE TO RELATED APPLICATION

This application is a Continuation of U.S. patent application Ser. No. 17/550,683, entitled "SMART IRRIGATION SYSTEM," filed Dec. 14, 2021, which claims priority to U.S. Provisional Patent Application Ser. No. 63/126,779, entitled "SMART IRRIGATION SYSTEM," which was filed on Dec. 17, 2020, and both of these applications are herein incorporated by reference in their entirety for all purposes.

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Soil conditions and/or weather conditions may cause soil settlement, which in turn may cause a foundation (e.g., concrete slab) of a structure to crack. Watering the foundation at proper times and locations may prevent the soil settlement and preserve structural integrity of the foundation. In some cases, a person may use a drip line irrigation system to water the foundation. However, this method may include a manual procedure. For example, the person may have to remember when and where to turn on the drip line irrigation system.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a smart irrigation system that includes a first sensor configured to monitor a moisture level at a location and a second sensor configured to monitor a contamination level within a fluid. The smart irrigation system also includes one or more processors configured to receive a first signal from the first sensor, receive a second signal from the second sensor, and route the fluid to the location in response to the first signal indicating that the moisture level is below a moisture threshold and the second signal indicating that the contamination level is below a contamination threshold.

In one embodiment, a smart irrigation system includes a first sensor configured to monitor a first moisture level at a first location, a second sensor configured to monitor a second moisture level at a second location, and a first sprinkler head configured to deliver water to the first location and the second location. The smart irrigation system also includes one or more processors configured to receive a first signal from the first sensor, receive a second signal from the second sensor, access a first moisture level threshold for the first location, and access a second moisture level threshold for the second location. The one or more processors are also configured to determine a first priority level for the first location based on a first difference between the first moisture level and the first moisture level threshold and a second priority level for the second location based on a second difference between the second moisture level and the second moisture level threshold. The one or more processors are also configured to control the first sprinkler head to direct a fluid from a fluid source to the first location and to the second location sequentially in response to the first priority level being higher than the second priority level.

In one embodiment, a method of operating a smart irrigation system includes receiving, at one or more processors, a first signal indicative of a moisture level at a location. The method also includes receiving, at the one or more processors, a second signal indicative of a contamination level within a fluid. The method further includes controlling, using the one or more processors, one or more valves to route the fluid to the location in response to the first signal indicating that the moisture level is below a moisture threshold and the second signal indicating that the contamination level is below a contamination threshold.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
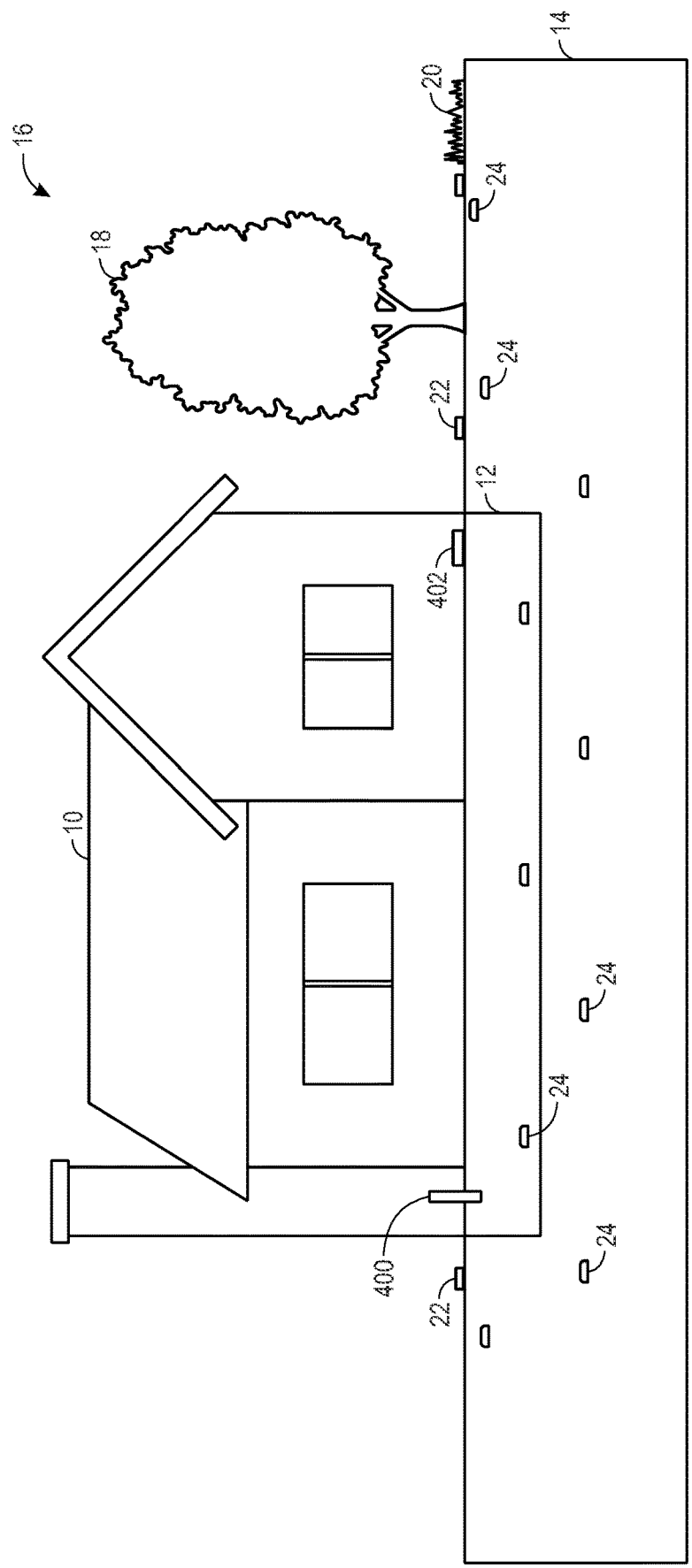
FIG. 1 illustrates a block diagram of a structure and a foundation with surrounding landscape, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. As used herein, the terms "computing system" and "controller" may refer to an electronic computing device such as, but not limited to, a single computer, virtual machine, virtual container, host, server, laptop, and/or mobile device, or to multiple electronic computing devices working together to perform the function described as being performed on or by the computing system or the controller.

A foundation is an element of a structure (e.g., building) that connects the structure to a ground and transfers loads (e.g., weight) from the structure to the ground. The foundation provides the structure stability from the ground. For example, the foundation may provide a leveled surface for construction of the structure, may anchor the structure into the ground to protect against natural forces (e.g., soil settlement, wind, flood, earthquake), and may distribute the weight of the structure to avoid overloading underlying soil, and so on.

Foundation settlement and/or cracking are serious problems that may cause potential damage or risks to the structure. The foundation settlement and/or cracking may occur in areas where the underlying soil expands when the soil is damp or shrinks when the soil is dry, thereby pushing or dragging the foundation to cause cracking. In some cases, the foundation settlement and/or cracking may occur when water-saturated soil freezes and expands (e.g., in winter time).

Watering the foundation may be a practical solution to prevent the foundation settlement and/or cracking. For example, during persistent hot and dry weather, watering the foundation regularly (e.g., daily) may help to mitigate the foundation settlement and/or cracking. Many people use a drip line irrigation system to water their foundations. The drip line irrigation system is a type of micro-irrigation system that has the potential to save water by allowing water to drip slowly to target locations (e.g., foundation areas, roots of plants) via tubing positioned above the soil surface or buried below the soil surface. The drip irrigation system distributes water through a network of the tubing, valves, pipes, and other components.

However, using the drip irrigation system to water the foundation at proper times and locations may be challenging. For example, the drip irrigation system may be operated manually based on visual observations (e.g., observing top soil conditions, plant growth, or cracks on concrete slabs) or automatically based on a watering schedule (e.g., daily, every other day, or every other two days). It may be difficult to operate the drip irrigation system to maintain a properly supported foundation without knowing the soil conditions (e.g., moisture level) around the foundation. Operating the drip irrigation system without knowing the soil conditions may result in under-watering or over-watering issues. Under-watering may not supply enough water to the foundation to prevent settlement and/or cracking. For example, if an amount of water applied to the foundation is only enough to keep the soil surface damp, the watering program will not work. On the other hand, over-watering may lead to serious foundation repairs caused by excessive water in the underlying soil.

Embodiments of the present disclosure are generally directed toward using a smart irrigation system to maintain appropriately moisturized soil to properly support a foundation. The smart irrigation system may use smart sensors (e.g., soil moisture sensors) to identify an area of the foundation that should be watered and then may spray the area with water using smart sprinkler heads. An amount of water sprayed may be adjusted based on soil conditions (e.g., soil moisture level) monitored by the smart sensors. Such dynamic adjustments may provide an efficient and accurate watering program that may avoid spraying water to all areas and wasting water. Present embodiments may use the smart sprinkler heads for dual purposes (e.g., watering the foundation and a landscape). For example, the smart sprinkler heads may be adjusted to spray dry areas of the foundation and then adjusted back to spray the landscape (e.g., lawn, garden, trees). In this case, the smart sensors may also be used to identify an area of the landscape that should be watered and to avoid excessive watering of the landscape as well.

With the foregoing in mind, in an embodiment, a smart irrigation system may be used to water a foundation (e.g., structure foundation) and/or a surrounding landscape (e.g., plants). The smart irrigation system may include multiple smart sprinkler heads, multiple smart sensors, and a controller (e.g., electronic controller). The smart sensors may monitor soil conditions and may provide signals indicative of the soil conditions to the controller. The controller may control each of the smart sprinkler heads based on moisture levels of soil around the foundation or the landscape. For example, in response to receiving the signals that indicate the moisture levels are below a moisture threshold in one area of the foundation, at least one of the smart sprinkler heads may be controlled automatically to spray the area with water from a water supply (e.g., tap water or private well). Similarly, in response to receiving the signals that indicate that the moisture levels are below the moisture threshold in one area of the landscape, at least one of the smart sprinkler heads may be controlled automatically to spray the area with water from the water supply. In both watering applications (watering the foundation and the landscape), the amount of water applied may be adjusted based on the soil conditions monitored by the smart sensors.

In addition, the smart irrigation system may use one or more additional water sources to water the foundation and the landscape. For example, the air conditioner (AC) water and/or gray water may be used as the one or more additional water sources to supplement the water supply, such as tap water or private well. The smart irrigation system may provide smart routing of water from different water sources to run watering programs more efficiently and cost effectively, while maintaining appropriately moisturized soil around the foundation and/or the landscape. It should be appreciated that the foundation may be a slab foundation, a pier and beam foundation, or any other suitable type of foundation.

Additional details with regard to the smart irrigation system, including the smart sprinkler heads, the smart sensors, and the dynamic adjustments of the amount and routing of the water (e.g., fluid) around the foundation and/or the landscape from different water sources (e.g., fluid sources), will be discussed in detail below with reference to FIGS. 1-4.

By way of introduction, FIG. 1 illustrates a block diagram of an embodiment of a structure 10 that is anchored into a ground by a foundation 12. The structure 10 may be a residential structure (e.g., single-family house, condo, apartment) or a commercial structure (e.g., office building). The foundation 12 may transfer loads (e.g., weight) from the structure 10 to soil 14. For example, the foundation 12 may be a concrete slab on which a single-family house is built. The structure 10 may be surrounded by a landscape 16 (e.g., yard) that may include trees and shrubs 18, lawn 20, gardens, or the like.

As mentioned, a smart irrigation system may be implemented to water the foundation 12 and/or the landscape 16 to maintain moisturized soil conditions around the foundation 12 and the landscape 16. The smart irrigation system may include smart sprinkler heads 22 and smart sensors 24. The smart sprinkler heads 22 may be distributed around the foundation 12 and/or the landscape 16. For example, some of the smart sprinkler heads 22 may be installed close to the foundation 12, while others may be installed close to roots of the trees and shrubs 18 and the lawn 20.

The smart sensors 24 may also be distributed around the foundation 12 and/or the landscape 16. For example, some of the smart sensors 24 may be installed between a centimeter and a meter below the surface of the ground and close to the foundation 12. In some embodiments, some of the smart sensors 24 may be in contact with and/or installed in the foundation 12 (e.g., embedded within a concrete slab or extending therefrom; in gaps between piers and beams that form the foundation 12).

The smart sensors 24 may measure conditions of the soil 14, such as moisture levels, movements, pH levels, and/or other physical or chemical properties of the soil 14 that may affect the foundation 12. As discussed in more detail below, the smart irrigation system may include a controller (e.g., electronic controller) communicatively connected to the smart sprinkler heads 22, the smart sensors 24, other sensors (e.g., sensors associated with a water source), and/or other controllable devices or components (e.g., valves, actuators). The controller may receive signals indicative of locations that need or may benefit from water from the smart sensors 24 and may adjust water flow to target these locations based on the received signals from the smart sensors 24. Adjusting water flow may include adjusting operation of the smart sprinkler heads 22, such as adjusting watering time and/or rate, adjusting routings of water to target different locations, adjusting routing of water from different water sources (e.g., tap water, reusable water), and so on. In some embodiments, the controller may be connected to a network to receive other inputs (e.g., weather conditions, user input). The controller may adjust the smart sprinkler heads 22 to water the foundation 12 and/or the landscape 16 based on received signals from the smart sensors 24 and/or other inputs.

As mentioned above, soil conditions (e.g., soil characteristics) may have notable effects on the foundation 12. The soil conditions may be related to soil types, which may be affected by moisture levels in the soil 14. Different types of soil may react to wet and dry conditions differently when bearing weight from the structure 10 and other structures around it (e.g., driveway, walkway).

The soil 14 may be clay-based soil. The clay-based soil may contain conservable amounts of clay and silt that may have potential to damage a foundation if appropriate water levels are not maintained. For example, the clay may absorb water easily and expand in volume as it becomes saturated. If allowed to become saturation, the clay-based soil may expand, causing the foundation 12 to heave, shift, and crack. If allowed to dry out, the clay-based soil may shrink, leaving gaps around the foundation 12 where water (e.g., rainfall) may penetrate more easily and trigger additional expansion cycles. Thus, monitoring the soil conditions and adjusting watering programs using the smart irrigation system become important to solve issues that would otherwise be caused by the expanding or the contracting of clay-based soil.

The soil 14 may be sand-based soil. Water may pass through the sand-based soil rather than being absorbed. Therefore, instead of expanding as it absorbs moisture or contracting as it dries out, the sand-based soil may maintain a relatively consistent volume and density. Because of its relative stability, the sand-based soil may have less movement, thereby causing less issues than other type of soils such as the clay-based soil. However, the sand-based soil may still benefit from the smart irrigation system that operates to maintain appropriate water levels within the sand-based soil.

The soil 14 may be sandy loam soil. The sandy loam soil is usually a fairly stable soil that may show less change with the increase or decrease of moisture than the clay-based soil. However, a foundation built on the sandy loam soil may have a potential for more erosion-related issues than other types of soil. When it is allowed to erode, the sandy loam soil underneath the foundation 12 may become less stable to sustain the weight of the structure 10, the foundation 12, and other structures around the structure 10. In this case, monitoring the soil movement using the smart irrigation system (e.g., using soil movement sensors) may provide signals indicating potential foundation changes (e.g., foundation settlement) caused by the soil movement so that the potential foundation changes can be addressed and/or the smart irrigation system may be used to maintain appropriate water levels to combat the potential foundation changes.

Foundation settlement may occur when the underlying soil no longer properly supports the weight of the structure 10. Foundation settlement may be caused by various soil conditions, including but not limited to drying and shrinking of soil, wetting and softening of soil, poorly compacted fill soil (e.g., filled by a builder during construction), and so on.

In the absence of the smart irrigation system, drying and shrinking of soil may be caused by prolonged dry periods (e.g., drought). As mentioned above, the clay-based soil may shrink if it is allowed to dry. Then, the soil shrinkage may cause one or more sections of the foundation 12 to crack or settle into areas where settlements have occurred. As another example, maturing trees (e.g. trees 18) with long roots extending under the foundation 12 may draw excessive moisture from the underlying soil and cause it to shrink significantly if the moisture under the foundation 12 is not replenished.

Wetting and softening of soil may be caused by weather events, such as heavy rainfall or flooding. In the absence of the smart irrigation system, the wetting and softening of the soil may be made worse by applying water to the soil when the soil is already saturated after the weather events. For example, the clay-based soil may become soft as it absorbs and holds water, and the soil softening may cause the foundation settlement and shift, which may lead to cracks in the foundation 12 or bowings in the structure 10 (e.g., walls). Advantageously, the smart irrigation system may avoid applying the water to the soil when the soil is already saturated.

In addition to the smart sprinkler heads 22, the smart sensors 24, and the controller, the smart irrigation system may include other components or devices that may support or facilitate water flow control, water supply, water treatment, water disposal, electrical power supply, and so on. Such components or devices may include, but are not limited to, valves (e.g., isolation valve, control valve, pressure reducing valve, flush valve), backflow preventers, pressure regulators, filters (e.g., mesh screen filer), pipes (e.g., PVC or PEX pipe), drip tubing, piping and tubing adapters, emitters, connectors, end caps, and so on.

Figure 2:
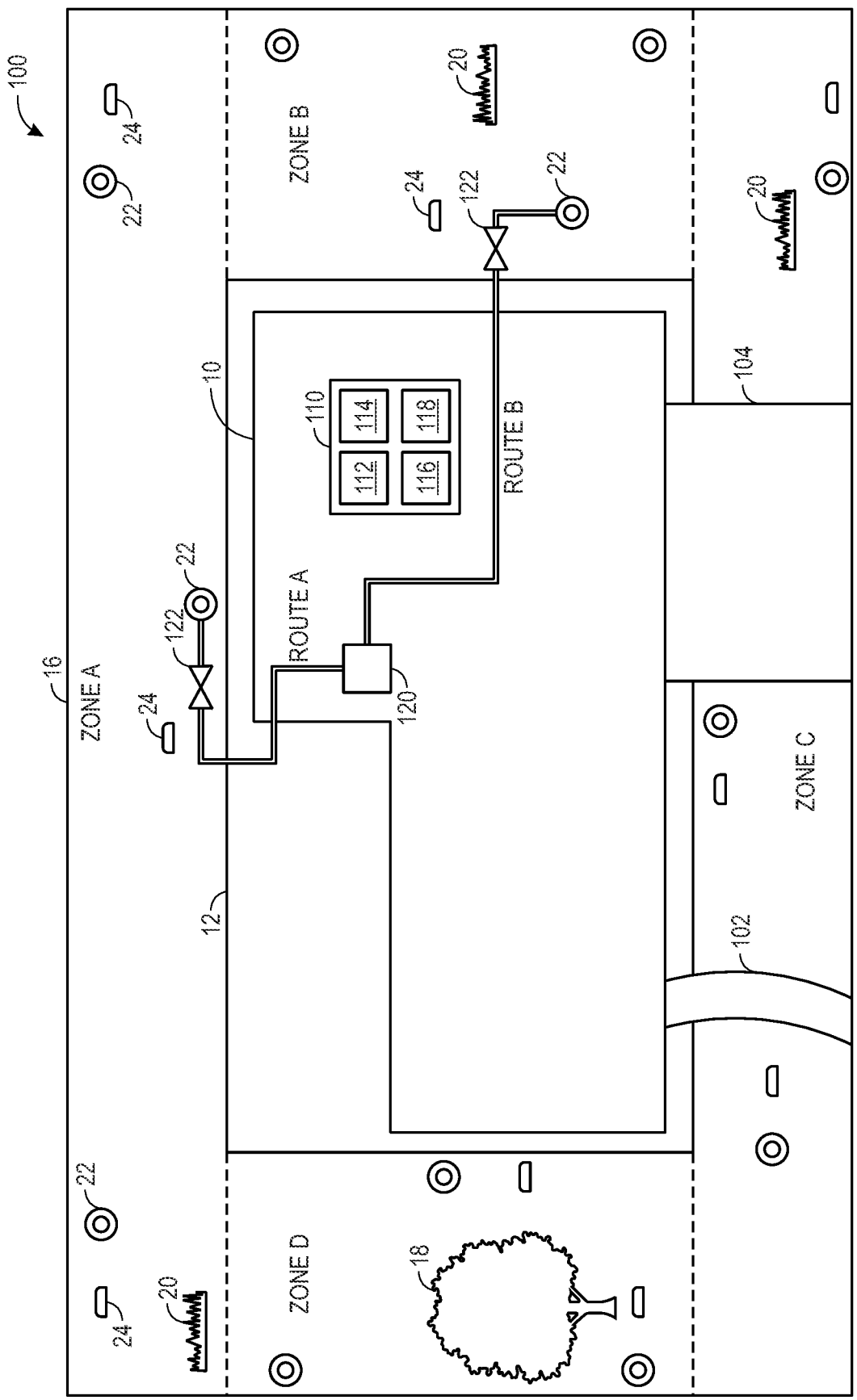
FIG. 2 illustrates a block diagram of a smart irrigation system that may be used to control water flow to irrigate the foundation and the surrounding landscape of FIG. 1, in accordance with embodiments described herein.

FIG. 2 is a block diagram of an embodiment of a smart irrigation system 100 that may be used to control water flow to irrigate the foundation 12 and/or the landscape 16. The foundation 12 anchors the structure 10 into the ground. Additionally, a walkway 102 and driveway 104 may connect to the foundation 12. As described previously, the foundation 12, the walkway 102, and the driveway 104 may be affected by the underlying soil movements caused by various conditions (e.g., soil conditions, weather conditions). By detecting target areas that need water and controlling water flow to the target areas, the smart irrigation system 100 may maintain appropriately moisturized soil to properly support the foundation 12, the walkway 102, the driveway 104, and/or other structures.

The landscape 16 may be divided into multiple zones such that each zone may be irrigated differently (e.g., different watering locations, routings, time schedules, rates, sources) using the smart irrigation system 100. In present embodiment, the landscape 16 is divided into four zones: ZONES A, B, C, and D. Each zone may have one or more smart sprinkler heads 22 and one of more smart sensors 24 installed in different locations. Some of the smart sprinkler heads 22 and the smart sensors 24 may be distributed close to the foundation 12, the walkway 102, and the driveway 104, while others may be distributed close to the plants (e.g., trees and shrubs 18, grass on the lawn 20).

The smart sensors 24 may include different types of sensors, such as soil moisture sensors, soil movement sensors, strain sensors, temperature sensors, or any other suitable sensors that may measure soil conditions. A sensing mechanism may be formed by including a moisture sensor mesh that detects dry areas around the foundation 12, a movement sensor mesh that detects movement of the soil 14 and/or the foundation 12, and a moisture sensor mesh that detects dry areas within the soil 14 in the landscape 16.

The soil moisture sensor may use capacitance to measure dielectric permittivity of the surrounding medium. In the soil 14, the dielectric permittivity may be a function of a moisture level. The soil moisture sensor may generate a voltage signal proportional to the dielectric permittivity, which is related to the moisture level of the soil 14 based on the function. The soil movement sensors may utilize a sliding potentiometer that converts distances into stresses and a humidity sensor. The soil movement sensors may provide information regarding linear motion, tilt, and rotation of the soil mass, which may indicate the soil movement. The strain sensors may measure deformations at certain points and in certain directions in the foundation 12, which may enable assessment of induced stresses at those points. The strain sensors may include different types of sensors based on different physical principles, such as vibrating wire sensors and variable resistance gauges.

The smart sensors 24 distributed close to the foundation 12, the walkway 102, and the driveway 104 may generate foundation-related signals indicating that moisture levels are below a moisture threshold (e.g., foundation moisture threshold) at a foundation area, a walkway area, and/or a driveway area. The other smart sensors 24 distributed close to the plants and lawn 20 may generate landscape-related signals indicating that moisture levels are below a moisture threshold (e.g., landscape moisture threshold) at a landscape area and that water is needed at the landscape area. The moisture threshold for the foundation area and similar areas may be different than the moisture threshold for the landscape area. Furthermore, there may be multiple moisture thresholds for the foundation area and multiple moisture thresholds for the landscape area, and each of the multiple moisture thresholds (e.g., one for ZONE A, another one for ZONE B, and so on) may be set and/or dynamically generated based on relevant parameters (e.g., soil type; prior sensor data, such as prior movement with certain moisture levels). The foundation-related signals and the landscape-related signals may include measured moisture level, zone identification (e.g., ZONE A/B/C/D), smart sensor identification (e.g., serial number of a corresponding smart sensor 24, which is associated with a location). The smart irrigation system 100 may operate to maintain the moisture levels at (e.g., to match or substantially match) the moisture thresholds.

Although in present embodiment the smart sensor 24 is separate from the smart sprinkler head 22, it should be noted that, in some embodiments, the smart sensor 24 may be integrated into the smart sprinkler head 22. In some embodiments, some of the smart sensors 24 may be separated from the smart sprinkler heads 22, while the others may be integrated into the smart sprinkler heads 22.

A controller 110 (e.g., electronic controller) may be communicatively connected to the smart sprinkler heads 22, the smart sensors 24, other sensors (e.g., sensors associated with a water source), and other controllable devices or components (e.g., valves, actuators). As mentioned previously, the controller 110 may receive foundation-related signals indicating that moisture levels are below the moisture threshold at a foundation area from the smart sensors 24 installed around the foundation 12 (e.g., between a centimeter and a meter below the surface of the ground) or coupled to or installed directly in the foundation (e.g., embedded within the concrete or extending therefrom). The controller 110 may also receive landscape-related signals indicating that moisture levels are below the moisture threshold at a landscape area from the smart sensors 24.

The controller 110 may analyze the received signals and determine a set of watering parameters including, but not limited to, a list of areas that need water, a watering sequence of the listed areas, start and end time of the watering for each listed area, water flow rate of each listed area, water routing to each listed area, water source for each listed area, and the like. The set of watering parameters may be determined based on the analyzed signals, the moisture thresholds, irrigation system specifications (e.g., water pressure, water flow rates at individual sprinkler heads, control valve capacities, component/device identifications, system deployment maps) stored in the controller 110 (e.g., in a memory), and local soil condition (e.g., soil type) record stored in the controller 110. For example, the controller 110 may determine that the moisture level measured by the smart sensor 24 near the lawn 20 in Zone A is below the moisture threshold (e.g., the landscape moisture threshold) and that the moisture level measured by the smart sensor 24 near the foundation 12 in Zone C is below the moisture threshold (e.g., the foundation moisture threshold). The controller 110 may instruct the smart sprinkler head 22 near the lawn 20 in Zone A to water the lawn 20 and may instruct the smart sprinkler head 22 near the foundation 12 in Zone C to water the foundation 12. The watering may occur simultaneously, such as when a water source 120 (e.g., water supply) has sufficient water. Or the watering may occur sequentially, such as when the water source does not have sufficient water or when one smart sprinkler head 22 should be used to water both areas that are in need of water (e.g., the smart sprinkler head 22 is used to water one area, and then the smart sprinkler head 22 is driven to rotate and is used to water another area).

If the watering occurs sequentially, the controller 110 may determine a priority for the areas that are in need of water. For example, the controller 110 may prioritize the foundation 12 over the landscape 16 (e.g., water the foundation 12 first), may prioritize based on a user's preference previously input to the controller 110, and/or may prioritize based on the moisture level (e.g., water the area with the lowest moisture level first; water the area with a greatest percentage difference between the moisture level and the moisture threshold first). In any case, the controller 110 may determine and/or access (e.g., from a database) the set of the watering parameters for each area that needs watering, and then the controller 110 may control the smart sprinkler heads 22 to carry out the watering with the set of the watering parameters. The controller 110 may continue to receive the signals from the smart sensors 24 as part of a feedback loop and may stop the watering in response to the signals from the smart sensors 24 indicating that an appropriate moisture level is reached (e.g., a target moisture level; the moisture level exceeds the moisture threshold).

In some embodiments, the controller 110 may use received signals from the smart sensors 24 and additional inputs to determine the watering parameters with improved efficiency and/or accuracy. The additional inputs may include supplemental weather data (e.g., weather data received via a network connected to the controller 110) and user inputs (e.g., environment changes, such as flood discharge in a local area). In some embodiments, the controller 110 may use a computational model to predict foundation movements based on the received signals and determine an appropriate watering program based on the predictions. Such computer modeling may be performed by on-board processor(s) or microprocessor(s) in the controller 110, by a local computing devices (e.g., desk top computer, laptop) located in the structure 10 and connected to the controller 110, or by a remote computing device (e.g., a cloud server).

Based on analytic results, such as the set of watering parameters, the controller 110 may adjust water flow to target locations (e.g., locations around the foundation 12 and/or in the landscape 16). Adjusting water flow may include modifying operations of the smart sprinkler heads 22 and other controllable devices or components (e.g., valves, actuators) to adjust watering areas, watering sequence, watering time, water flow rate, water routing, water source, and so on.

In some embodiments, the controller 110 may be connected to a network to receive other inputs (e.g., weather conditions, user inputs). The other inputs may also be used by the controller 110 to adjust water flow to target locations. For example, in addition to the signals from the smart sensors 24, supplemental weather data may be used to indicate when the foundation 12 and the landscape 16 needs watering. As mentioned previously, a constant cycle of wet and dry periods may occur as the weather changes, causing certain types of soil (e.g., clay-based soil) to expand and contract continuously. The smart irrigation system 100 may be operated in a manner that is intended to reduce negative effects of the weather changes. The supplemental weather data may be obtained via remote services (e.g., via the Internet). In one embodiment, the smart sensors 24 may detect that the foundation 12 may be dry and need watering. However, detected rainfall (e.g., current rainfall) and/or predicted rainfall within a threshold time period (e.g., within 1, 2, 3, 12, or 24 hours) based on the supplemental weather data may cause the controller 110 to override or to block the watering by the smart irrigation system 100. If the rainfall ends and/or the threshold time period expires without an indication of improved moisture to match (e.g., substantially match) the moisture threshold, the watering may be initiated.

As illustrated, the controller 110 may include a processor 112, a memory 114, a display 116, and a communication interface 118. The processor 112 may be configured to receive and analyze the signals generated and transmitted from the smart sensors 24 and other sensors. The processor 112 may run data analysis based on received signals using processor-executable code stored in the memory 114. The data analysis may include a data modeling process that may use a computational model to predict foundation movements based on the received signals and/or determine appropriate watering parameters based on the predictions. In some embodiments, the controller 110 may use the communication interface 118 to send the received signals or analyzed signals to other computing devices (e.g., a local desktop computer, a cloud server) to perform the data modeling process. Data analysis results (e.g., analytic and modeling results) may be stored in the memory 114 for later usage.

The processors 112 may be any type of computer processor or microprocessor capable of executing computer-executable code. The processors 112 may include single-threaded processor(s), multi-threaded processor(s), or both. The processors 112 may include hardware-based processor(s) each including one or more cores. The processors 112 may include general purpose processor(s), special purpose processor(s), or both. The processors 112 may be communicatively coupled to other internal components such as memory 114, display 116, and communication interface 118.

The memory 114 may be any suitable articles of manufacture that can serve as media to store processor-executable code, data, or the like. These articles of manufacture may represent computer-readable media (e.g., any suitable form of memory or storage) that may store the processor-executable code used by the processor 112 to perform the presently disclosed techniques. The memory 114 may also be used to store data described (e.g., irrigation system specifications, local soil condition record, user inputs), various other software applications for data analysis or modeling. The memory 114 may represent non-transitory computer-readable media (e.g., any suitable form of memory or storage) that may store the processor-executable code used by the processor 112 to perform various techniques described herein. It should be noted that non-transitory merely indicates that the media is tangible and not a signal.

The display 116 may operate to depict visualizations associated with software or executable code being processed by the processor 112. In an embodiment, the display 116 may be a touch display capable of receiving inputs from a user (e.g., an operator) of the smart irrigation system 100. The display 116 may be any suitable type of display, such as a liquid crystal display (LCD), plasma display, or an organic light emitting diode (OLED) display, for example. Additionally, in an embodiment, the display 116 may be provided in conjunction with a touch-sensitive mechanism (e.g., a touch screen) that may function as part of a control interface for the smart irrigation system 100.

The communication interface 118 be used by the processor 112 to adjust operations of smart sprinkler heads 22, the smart sensors 24, other sensors (e.g., sensors associated with water source), and other controllable devices or components (e.g., valves, actuators) via one or more communication medium (e.g., cables, WiFi, or radio frequency). In some embodiments, the processors 112 may generate a notification to a user (e.g., owner of the structure 10) based on the analytic and modeling results. The communication interface 118 may provide the notification (e.g., text message, E-mail, voice mail) to a user device (e.g., smart phone or watch). In some embodiments, the communication interface 118 may be in communication with a network (e.g., Internet) to obtain additional information including the supplemental weather data and/or user inputs.

The communication interface 118 may include communication protocols to facilitate communications between the controller 110 and other components, devices and systems, including but not limited to the smart sprinkler heads 22, the smart sensors 24, other sensors and controllable devices or components (e.g., valves, actuators), the local computing devices (e.g., desk top computer, laptop), the user device (e.g., phone or watch), and the network.

Additionally, the controller 110 may include other relevant components (e.g., storage, network controller, I/O ports, power supply, or battery). It should be noted that the components described above with regard to the smart irrigation system 100 are exemplary components and the smart irrigation system 100 may include additional or fewer components as shown.

The smart irrigation system 100 may use the water source 120 to provide water to irrigate the foundation 12 and/or the landscape 16. The water source 120 may use tap water (e.g., city water, town water, municipal water) and/or well water (e.g., private or public well). The water from the water source 120 may be routed to different zones via different routes. For example, the water may flow to the ZONE A via a route A (e.g., including pipes and a respective control valve 122) or to the ZONE B via a route B (e.g., including pipes and a respective control valve 122). The control valve 122 may be used to regulate water pressures, turn the water on and off, and/or control which of the smart sprinkler heads 22 receive the water from different routes.

For image clarity, route A with the respective control valve 122 is provided to couple one of the smart sprinkler heads 22 to the water source 120, and route B with the respective control valve 122 is provided to couple one of the smart sprinkler heads 22 to the water source 120. However, it should be appreciated that each of the smart sprinkler heads 22 is coupled to the water source 120 and that this may be accomplished in any of a variety of ways. For example, each control valve 122 may control water flow to one or more sprinkler heads 22 distributed around the foundation 12 and/or the landscape 16. In some embodiments, the smart sprinkler heads 22 in ZONE A may be divided into multiple groups each controlled by a corresponding control valve 122. That way the controller 110 may adjust the water flow to specific locations that need water. In some embodiments, a valve manifold may be used to control the water flow to one or more zones. The valve manifold may include a collection of the control valves 122. The control valves 122 may be controlled (e.g., via control of actuators associated with the control valves 122) by the controller 110 to carry out the watering program. The smart irrigation system 100 may water each zone (or respective part of each zone) until the moisture level as detected by the smart sensors 24 matches the respective moisture threshold (e.g., within 5 or 10 percent), and thus, the smart irrigation system 100 may operate as a feedback loop system. In some cases, the smart irrigation system 100 may set a watering schedule based on signals from the smart sensors 24 (e.g., moisture levels) and/or other information (e.g., moisture thresholds, weather forecast) to set a watering schedule or plan that the smart irrigation system 100 determines to be appropriate (e.g., expected to cause the moisture level to match the moisture threshold, if implemented; the watering schedule may run without shutting on/off based on feedback).

In some embodiments, one or more additional water sources may be used to irrigate the foundation 12 and/or the landscape 16. The additional water sources may include air conditioner (AC) water, gray water, and/or any suitable water sources that may be used as additional water supplies to replace or to supplement the water source 120 (e.g., tap water or private well). Using reusable water sources and/or routing water from different sources accordingly, the smart irrigation system 100 may enable running watering programs efficiently and cost effectively, while maintaining appropriately moisturized soil around the foundation 12 and in the landscape 16.

Figure 3:
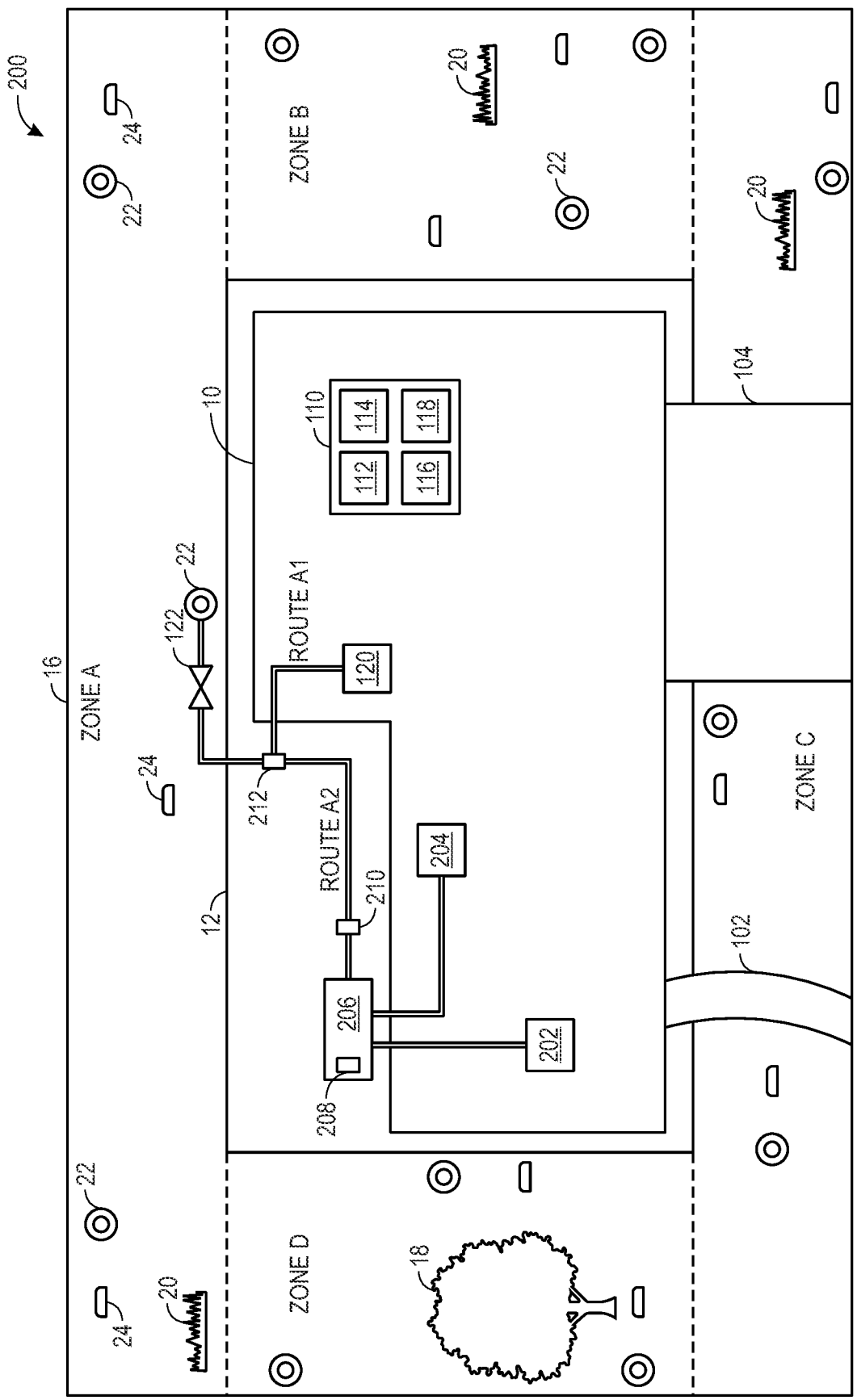
FIG. 3 illustrates a block diagram of another smart irrigation system that may be used to control water flow to irrigate the foundation and the surrounding landscape of FIG. 1, in accordance with embodiments described herein.

With the foregoing in mind, FIG. 3 illustrates a block diagram of an embodiment of another smart irrigation system 200 that may be used to control water flow to irrigate the foundation 12 and/or the landscape 16. In addition to or as an alternative to the water source 120 using tap or well water, other water sources (e.g., reusable water) may be used as supplemental water sources. For example, the structure 10 may have gray water generated in the structure 10 from streams without fecal contamination (e.g., streams except for wastewater from toilets). Sources of gray water may include various appliances, such as sinks (e.g., sink 202), showers, baths, washing machines, dishwashers, and so on. In some embodiments, the structure 10 may have emergency overflows for appliances like an air-conditioner 204 that may generate air-conditioning condensate.

A catch basin 206 may be used to collect gray water and/or air-conditioning condensate. The water collected in the catch basin 206 may be treated to some extent (e.g., extract unwanted substances, such as soap or detergent) and used to water the foundation 12 and/or the landscape 16 based on instructions from the controller 110. The water treatment may include biological treatment, chemical treatment, or other suitable treatments. For example, certain acid-based treatments may remove the soap from the water. In some cases, activated carbon may be used to remove detergent from the water.

A sensor 208 may be used to monitor the condition (e.g. composition; levels of soap, detergent, and heavy oil) in the catch basin 206. The sensor 208 may include chemical sensors (e.g., impedimetric sensor), optical sensors (e.g., turbidity sensor), biosensors, electrochemical biosensors, other suitable sensors, or a combination thereof. The sensor 208 may generate gray water related signals and transmit the signals to the controller 110. In some embodiments, the sensor 208 may include water volume or level sensor that may measure how much water is available in the catch basin 206. A filter 210 may be used to remove certain substances and contaminations in the water from the catch basin 206. The filter 210 may include a screen filter, a membrane filter, an activated carbon or alumina filter, other suitable filters, or combination thereof.

The controller 110 may monitor conditions (e.g., movement, moisture) of the foundation 12 and/or the landscape 16 using the smart sensors 24. Additionally, the controller 110 may monitor conditions in the catch basin 206 using the sensors 208 that may detect levels of contamination (e.g., detergent or chlorine levels) in the water. If a certain type of an unwanted substance and/or a threshold amount of the unwanted substance (e.g., dish soap) is detected in the water in the catch basin 206, the controller 110 may route the water to the foundation 12 and/or may block the water from being deposited into the landscape 16. In some embodiments, if a certain type of unwanted substance (e.g., contaminant, such as heavy oil) is detected, the controller may direct the water to sewage and/or may block the water from being deposited at the foundation 12 and the landscape 16.

Specific water routing may be controlled by the controller 110 based on monitored conditions and corresponding data analysis and modeling. For example, the controller 110 may determine that the landscape 16 needs moisture, and the controller 110 may check the catch basin 206 by analyzing the gray water related signals generated by the sensor 208. If catch basin water is not available (e.g., empty or below a threshold volume or level) or unsuitable for distribution at the landscape 16 (e.g., detergent that cannot be filtered), the water from the water source 120 may be used via a route A1 to corresponding smart sprinkler heads 22 installed in the landscape 16. If the catch basin water is available (e.g., above the threshold volume or level) and not contaminated, the catch basin water may be used via a route A2 to the corresponding smart sprinkler heads 22. A valve or valve manifold 212 may be used to switch between route A1 and A2.

In another example, the controller 110 may determine that the foundation 12 needs moisture, and the controller 110 may check the catch basin 206 by analyzing the gray water related signals generated by the sensor 208. If catch basin water is not available or unsuitable for distribution at the foundation 12 (e.g., heavy oil that cannot be filtered), the water from the water source 120 may be used via the route A1 to the corresponding smart sprinkler heads 22 installed around the foundation 12. If the catch basin water is available and not heavily contaminated (e.g., by heavy oil), the catch basin water may be used via the route A2 to the corresponding smart sprinkler heads 22. The valve or valve manifold 212 may be used to switch between route A1 and A2.

The levels of suitable contamination or composition of the water in the catch basin 206 may vary by distribution area. For example, certain compositions may be suitable for the foundation 12, but may not be suitable for the landscape 16 (e.g., may damage plants). Thus, during certain watering events or sequences, the smart irrigation system 200 may distribute water from the water source 120 to the one or more smart sprinkler heads 22 nearby and/or aimed at the landscape 16 to match the moisture level of the landscape 16 to the respective moisture threshold (or to otherwise wet the soil in the landscape 16). Then, the smart irrigation system 200 may distribute water from the catch basin 206 to the one or more smart sprinkler heads 22 nearby and/or aimed at the foundation 12 to bring the moisture level of the foundation 12 to the respective moisture threshold (or to otherwise wet the soil around the foundation 12). For example, one of the smart sprinkler heads 22 may direct water from the water source 120 to the landscape 16, and then be instructed to rotate to direct water from the catch basin 206 to the foundation 12. It may be advantageous to provide the water from the water source 120 first, and then to provide the water from the catch basin 206 to block delivery of any contaminants to the landscape 16. In some cases, the smart irrigation system 200 may carry out a flushing or cleaning protocol (e.g., before rotating the one or more smart sprinklers; to run water from the water source 120 through the one or more smart sprinkler heads 22 while aimed at the foundation 12 before rotating to water the landscape 16).

For image clarity, route A1 is provided to couple one of the smart sprinkler heads 22 to the water source 120, and route A2 is provided to couple the one of the smart sprinkler heads 22 to the catch basin 206. However, it should be appreciated that all the smart sprinkler heads 22 may be coupled to the water source 120 and/or the catch basin 206, and that this may be accomplished in any of a variety of ways (e.g., via a system of fluid conduits and valves).

In addition to the signals from the smart sensors 24 and the sensor 208, supplemental weather data may be used to indicate when the foundation 12 and the landscape 16 needs watering. The supplemental weather data may be obtained via remote services (e.g., via the Internet). In one embodiment, the smart sensors 24 may detect that the foundation 12 or the landscape 16 may be dry and need foundation watering. However, predicted or detected rainfall based on the supplemental weather data may cause the controller 110 to adjust the watering in the manner set forth above with respect to FIG. 2.

The processor 112 may be configured to receive and analyze the signals generated and transmitted from the smart sensors 24 and the sensor 208. The processor 112 may run data analysis based on received signals using processor-executable code stored in the memory 114. The data analysis may be used to by the processor 112 to create instructions for the catch basin 206 to treat the gray water (e.g., remove soap or detergent), instructions. The data analysis may also include a data modeling process that may use a computational model to predict foundation movements based on the received signals and determine appropriate watering parameters based on the predictions. In some embodiments, the controller 110 may use the communication interface 118 to send the received signals or analyzed signals to other computing devices (e.g., a local desktop computer, a cloud server) to perform the data modeling process. Data analysis results (e.g., analytic and modeling results) may be stored in the memory 114 for later usage.

Figure 4:
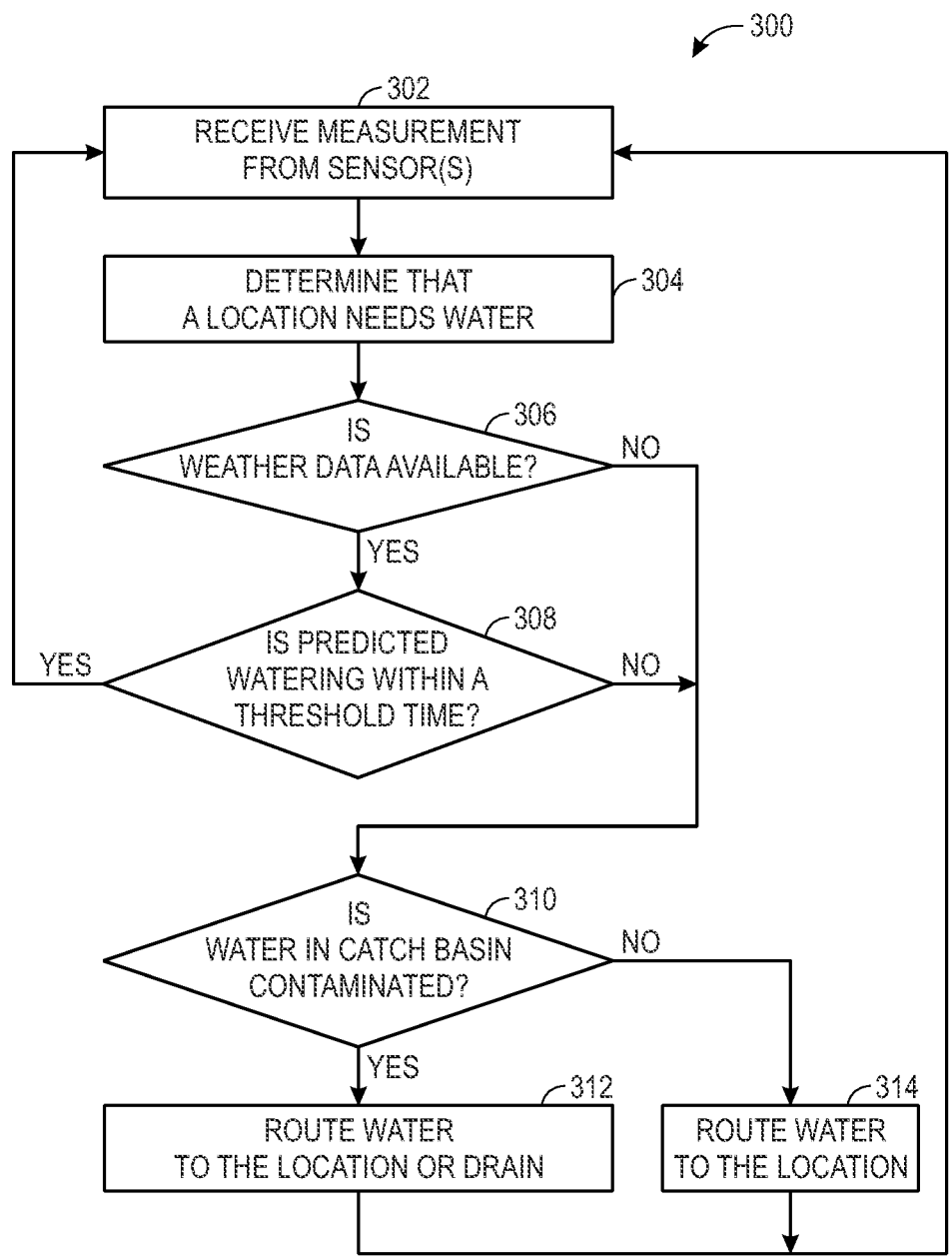
FIG. 4 illustrates a flow diagram of a process for employing the smart irrigation system of FIG. 3, in accordance with embodiments described herein.

FIG. 4 illustrates a flow diagram of an embodiment of a process 300 for employing the smart irrigation system 200 of FIG. 3. The flow diagram includes various steps represented by blocks. Although the flow diagram illustrates the steps in a certain sequence, it should be understood that the steps may be performed in any suitable order and certain steps may be carried out simultaneously, where appropriate. Further, certain steps may be omitted and/or other steps may be added. While certain steps are described as being performed by the controller 110, it should be understood that the steps or portions thereof may be performed by any suitable processing device.

The controller 110 may receive measurements from sensors (process block 302). The sensors may include the smart sensors 24 distributed around the foundation 12, the landscape 16, the walkway 102, and the driveway 104. The smart sensors 24 may measure soil conditions, such as moisture levels. The measurements may be transmitted to the controller 110 via the communication interface 118.

Based on the received measurement data from the sensors, the controller 110 may determine that a location needs water (process block 304). The location may be a spot close to a portion of the foundation 12 or a spot close to a portion of the landscape 16. The received measurements may indicate that a moisture level at that location is below a moisture threshold. The moisture threshold may be pre-determined and/or stored in the memory 114. It should be appreciated that one or more moisture thresholds may be set or dynamically generated, such as for each zone or for various areas within each zone (e.g., landscape areas, foundation areas) and/or based on prior sensor data, soil type, or the like.

The controller 110 may determine if weather data is available (process block 306). The weather data may include the supplemental weather data obtained via remote services (e.g., via the Internet). If the weather data is not available, the controller 110 may then determine whether water in the catch basin 206 is contaminated (process block 310).

If the weather data is available, the controller 110 may further determine whether a predicted watering is within a threshold time (process block 308). For example, based on the supplemental weather data, the controller 110 may predict a rainfall that is within a threshold time (e.g., three days). The controller 110 may then override a watering for the threshold time and the process 300 will return to the process block 302 to receive new measurements from the sensors. If the threshold time expires and new measurements shows no indication of improved moisture (e.g., no rainfall occurred or insufficient rainfall received), the controller 110 may resume the watering.

If the controller 110 determines that the predicted watering is not within the threshold time, the controller 110 may further determine whether water in the catch basin 206 is contaminated (process block 310). At process block 310, if the controller 110 determines that the water in the catch basin 206 is contaminated based on the measurements from the sensor 208, the controller 110 may route water to the location or drain it (e.g., to a sewage) (process block 312). For example, if the water in the catch basin 206 is contaminated, the controller 110 may assess whether water quality is acceptable for the location (e.g., foundation area may accept lightly contaminated water that may have soap or detergent, but no heavy oil). If the water quality is acceptable, the controller 110 may direct the water to the location. If the water quality is not acceptable, the water may be directed to a sewage. The process 300 may then return to the process block 302 to receive new measurements from the sensors.

If the controller 110 determines that water in the catch basin 206 is not contaminated and is usable, the controller 110 may route the water to the location (process block 314). The location may be around the foundation 12 and/or the landscape 16. The process 300 may then return to the process block 302 to receive new measurements from the sensors.

Other features may be incorporated into the smart irrigation system. For example, beads or particles may be provided (e.g., pumped into cracks in dry areas of soil or adjacent to dry areas of a foundation) to retain moisture around the foundation. Furthermore, certain types of foam may be utilized to push the foundation in a certain direction or to otherwise provide support to the foundation in weak spots (e.g., as determined by the soil or foundation movement). Once proper alignment of the foundation is achieved, a solidifying compound (e.g., to fill air pockets) may be injected in or around the foundation. The foundation may incorporate a visual indicator material, as represented by number 400 in FIG. 1. For example, a lack of water may create color change in the visual indicator material that informs or notifies the user to water the foundation. The visual indicator material may be formed into a vein-like or branched structure on a side wall of the structure supported by the foundation or on a visible portion of the foundation. The branched structure may carry the moisture up the side wall of the structure to facilitate visualization by the user. In some embodiments, the moisture may operate to activate or to deactivate a light emitter (e.g., by completing an electrical circuit), which is represented by number 402 in FIG. 1. For example, the moisture may connect two wires embedded in the foundation to one another to complete the electrical circuit, which may cause illumination of the light emitter visible from inside and/or outside the structure supported by the foundation.

The technologies described in the disclosed embodiments include using a smart irrigation system to maintain appropriately moisturized soil to properly support a foundation. The smart irrigation system may use smart sensors (e.g., soil moisture sensor) to identify locations that need water and irrigate the locations with water using smart sprinkler heads. An amount of water provided may be adjusted based on soil conditions (e.g., moisture level) monitored by the smart sensors. The dynamic adjustment may provide an efficient and accurate watering program, thus avoiding watering all areas and wasting water. Present embodiments may use the smart sprinkler heads for dual purposes (e.g., watering the foundation and a landscape). For example, the smart sprinkler heads may be adjusted (e.g., moved, rotated) to water dry areas of a foundation and then adjusted back to water the landscape (e.g., lawn, garden, trees). That is, the smart sensors may be used to identify an area of the landscape that needs watering and avoid excessive watering as well.

In addition, present embodiments may include an infrastructure to route gray water to the foundation and/or the landscape. A catch basin may be used to collect gray water and clean it to some extent (e.g., extracting substances such as soap via a filter or the like) and redirect the water to the foundation and/or the landscape based on instructions from a controller, which monitors parameters (e.g., movement, moisture) of the foundation and/or the landscape. Specific routing paths may be controlled depending on needs, including routing to landscape instead of foundation areas. It should be appreciated that any of the features shown and described with reference to FIGS. 1-4 may be combined in any suitable manner.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A smart irrigation system, comprising:
a first sensor configured to monitor a moisture level of soil at a location;
a second sensor configured to monitor a movement of the soil at the location; and
a computing system comprising one or more processors and configured to:
receive a first signal indicative of the moisture level of the soil at the location from the first sensor;
receive a second signal indicative of the movement of the soil at the location from the second sensor; and
control one or more valves to route a fluid from one or more fluid sources to the location based on a watering program in response to the first signal indicating that the moisture level at the location is below a moisture threshold and the second signal indicating one or more potential changes caused by the movement of the soil, wherein the watering program is determined by:
predicting, via a computational model, a movement of the location based on the second signal; and determining, via the computational model, one or more watering parameters of the watering program based on the predicted movement of the location.

2. The smart irrigation system of claim 1, wherein the location comprises a foundation of a structure, and wherein the one or more potential changes comprise a potential foundation change of the structure caused by the movement of the soil.

3. The smart irrigation system of claim 2, wherein the smart irrigation system is configured to use the fluid routed to the location to maintain moisturized soil that mitigates the potential foundation change.

4. The smart irrigation system of claim 2, wherein the second sensor comprises a soil movement sensor configured to provide a measurement associated with the movement of the soil at the location and surrounding the foundation, and wherein the measurement comprises linear motion, tilt, rotation, or any combination thereof of soil mass.

5. The smart irrigation system of claim 4, wherein the soil movement sensor is configured to utilize a sliding potentiometer.

6. The smart irrigation system of claim 2, wherein the second sensor comprises a strain sensor configured to measure one or more deformations in one or more directions in the foundation.

7. The smart irrigation system of claim 1, wherein the one or more processors are configured to:
receive additional data associated with the watering program;
determine an adjustment of the watering program based on the additional data; and
implement the adjustment to change the watering program.

8. The smart irrigation system of claim 7, wherein the additional data comprises weather data indicating watering time information at the location.

9. The smart irrigation system of claim 1, wherein the computing system is configured to:
set or dynamically generate the moisture threshold based on a soil type of the soil at the location.

10. The smart irrigation system of claim 9, wherein the computing system is configured to:
set or dynamically generate the moisture threshold based on historical sensor data comprising historical soil movements of the soil at the location.

11. The smart irrigation system of claim 1, comprising a third sensor configured to monitor a contamination level within a fluid, wherein the computing system is configured to:
receive a third signal indicative of the contamination level within the fluid from the third sensor; and
control the one or more valves to block the fluid from the one or more fluid sources to the location in response to the third signal indicating that the contamination level is above a contamination threshold.

12. A smart irrigation system, comprising:
a first sensor configured to monitor a moisture level of soil at a location;
a second sensor configured to monitor a movement of the soil at the location;
a third sensor configured to monitor a contamination level within a fluid; and
a computing system comprising one or more processors and configured to:
receive a first signal indicative of the moisture level of the soil at the location from the first sensor;
receive a second signal indicative of the movement of the soil at the location from the second sensor;
receive a third signal indicative of the contamination level within the fluid from the third sensor; and
control one or more valves to route the fluid to the location in response to the first signal indicating that the moisture level at the location is below a moisture threshold, using the second signal by a computation model to predict the movement of the soil at the location, and the third signal indicating that the contamination level is below a contamination threshold, wherein the moisture threshold is dynamically generated based on a soil type of the soil at the location, historical sensor data comprising historical soil movements of the soil at the location, or both.

13. The smart irrigation system of claim 12, wherein the fluid comprises treated water from a water treatment process, and wherein the water treatment process is configured to produce the treated water using gray water from a plurality of fluid sources.

14. The smart irrigation system of claim 13, wherein the plurality of fluid sources comprises one or more sinks, one or more showers, one or more baths, one or more washing machines, one or more dishwashers, one or more air-conditioners, or any combination thereof.

15. The smart irrigation system of claim 12, comprising a fourth sensor configured to measure an additional moisture level at an additional location.

16. The smart irrigation system of claim 15, wherein the computing system is configured to:
receive a fourth signal indicative of the additional moisture level at the additional location from the fourth sensor; and
control the one or more valves to route the fluid to the additional location in response to the fourth signal indicating that the additional moisture level at the additional location is below an additional moisture threshold and the third signal indicating that an additional contamination level is below an additional contamination threshold, wherein the moisture threshold is different from the additional moisture threshold, and wherein the contamination threshold is different from the additional contamination threshold.

17. The smart irrigation system of claim 16, wherein the additional moisture threshold is dynamically generated based on a soil type of the soil at the additional location, historical sensor data comprising historical soil movements of the soil at the additional location, or both.

18. A method of operating a smart irrigation system, comprising:
receiving, at a computing system comprising one or more processors, a first signal indicative of a moisture level at a location;
receiving, at the computing system comprising the one or more processors, a second signal indicative of a movement of soil at the location;
receiving, at the computing system comprising the one or more processors, a third signal indicative of a contamination level within a fluid; and
controlling, using the computing system comprising the one or more processors, one or more valves to route the fluid to the location in response to the first signal indicating that the moisture level at the location is below a moisture threshold, using the second signal by a computation model to predict the movement of the soil at the location, and the third signal indicating that the contamination level is below a contamination threshold, wherein the moisture threshold is dynamically generated based on a soil type of the soil at the location, historical sensor data comprising historical soil movements of the soil at the location, or both.

19. The method of claim 18, comprising:
controlling, using the computing system comprising the one or more processors, a water treatment process to produce treated water using gray water from a plurality of fluid sources, wherein the fluid comprises the treated water.

20. The method of claim 18, wherein the location comprises a foundation of a structure or landscaping surrounding the structure.

* * * * *